United States Patent
Bono

(10) Patent No.: US 7,162,666 B2
(45) Date of Patent: Jan. 9, 2007

(54) MULTI-PROCESSOR SYSTEM HAVING A WATCHDOG FOR INTERRUPTING THE MULTIPLE PROCESSORS AND DEFERRING PREEMPTION UNTIL RELEASE OF SPINLOCKS

(75) Inventor: Jean-Pierre Bono, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 502 days.

(21) Appl. No.: 10/810,530

(22) Filed: Mar. 26, 2004

(65) Prior Publication Data

US 2005/0223302 A1    Oct. 6, 2005

(51) Int. Cl.
G06F 11/00 (2006.01)
(52) U.S. Cl. ............. 714/51; 714/49; 714/50; 714/23; 714/24
(58) Field of Classification Search ........ 714/51, 714/23, 24, 49, 50
See application file for complete search history.

(56) References Cited

U.S. PATENT DOCUMENTS

| | | | |
|---|---|---|---|
| 4,604,694 A * | 8/1986 | Hough | 710/200 |
| 5,437,032 A | 7/1995 | Wolf et al. | 395/650 |
| 5,826,081 A | 10/1998 | Zolnowsky | 395/673 |
| 5,893,140 A | 4/1999 | Vahalia et al. | 711/118 |
| 5,922,057 A | 7/1999 | Holt | 710/52 |
| 5,951,672 A | 9/1999 | Kwok et al. | 712/28 |
| 5,987,621 A | 11/1999 | Duso et al. | 714/4 |
| 6,192,408 B1 | 2/2001 | Vahalia et al. | 709/229 |
| 6,223,204 B1 | 4/2001 | Tucker | 709/103 |
| 6,269,390 B1 | 7/2001 | Boland | 709/100 |
| 6,289,369 B1 | 9/2001 | Sundaresan | 709/103 |
| 6,324,581 B1 | 11/2001 | Xu et al. | 709/229 |
| 7,047,520 B1 * | 5/2006 | Moore et al. | 717/129 |
| 2002/0162051 A1 * | 10/2002 | Bolding et al. | 714/34 |
| 2003/0018691 A1 | 1/2003 | Bono | 709/106 |
| 2003/0084375 A1 * | 5/2003 | Moore et al. | 714/34 |
| 2005/0223302 A1 * | 10/2005 | Bono | 714/55 |

OTHER PUBLICATIONS

Lindsley, Rick; Global spinlock list and usage; Jun. 6, 2001; IBM Linux Tech. Center. pp. 1-33. http://lse.sourceforge.net/lockhier/global-spin-lock.*
EMC Celerra SE5 File Server, EMC Corporation, Hopkinton, MA, 2002, 2 pages.
"Celerra File Server in the E-Infostructure," EMC Corporation, Hopkinton, MA, 2000, 9 pages.
"Celerra File Server Architecture for High Availability," EMC Corporation, Hopkinton, MA, 1999, pp. 1-7.
"*MultiProcessor Specification Version 1.4,*" May 1997, Intel Corporation, Mt. Prospect, IL, 1993-1997, 1-1 to 5-8, A-1 to E-6.

(Continued)

Primary Examiner—Scott Baderman
Assistant Examiner—Tim Bonura
(74) Attorney, Agent, or Firm—Richard C. Auchterlonie; Novak Druce & Quigg, LLP

(57) ABSTRACT

Each processor in a multi-processor system is periodically interrupted for preempting the current thread for servicing of a watchdog thread during normal operation. Upon failing to service the watchdog thread over a grace period, a system watchdog initiates an orderly shutdown and reboot of the system. In order to prevent spinlocks from causing fake panics, if the current thread is holding one or more spinlocks when the interrupt occurs, then preemption is deferred until the thread releases the spinlocks. For diagnostic purposes, a count is kept of the number of times that preemption is deferred for each processor during each watchdog grace period.

34 Claims, 10 Drawing Sheets

OTHER PUBLICATIONS

Helen S. Raizen and Stephen C. Schwarm, "*Building a Semi-Loosely Coupled Multiprocessor System Based on Network Process Extension,*" Prime Computer, Inc., Framingham, MA, Pre-Publication Copy, Jan. 29, 1991, pp. 1-17.

Morioka et al., "Design and Evaluation of the High Performance Multi-Processor Server" IEEE International Conference on Computer Design: VLSI in Computers and Processors, IEEE Computer Society Press, Los Alamitos, CA 1994, pp. 66-69.

"Intel Xeon Processor: Unparalleled Value and Flexibilty for Small and Meduim Business Server Applications, " Intel Corporation, Santa Clara, CA, 2002, 4 pages.

"Intel Server Board SE7500WV2;" Intel Corporation, Santa Clara, CA, 2002, 6 pages.

"Building Cutting-Edge Server Applications: Intel Xeon Processor Family Features the Intel NetBurst Microarchitecture with Hyper-Threading Technology;" White Paper, Intel Corporation, Santa Clara, CA, 2002, 10 pages.

"Panicsel IMPI project: Summary," SourceForge.net, http://sourceforge.net/projects/panicsel, printed Mar. 12, 2004, 3 pages.

"Panic Handler Enhancements, Project Overview - panicsel," SourceForge.net, http://sourceforge.net/home.html, printed Feb. 5, 2004, 2 pages.

Cress, Andrew, "Panic Handler Enhancements for Linux 2.4, High-Level Design," Intel Corporation, SourceForge.net, http://sourceforge.net, printed Mar. 12, 2004, pp. 1-16.

Cox, Alan, "Watchdog Timer Interfaces for the Linux Operating System," http://stommel.tamu.edu, Texas A&M University, College Station, TX, printed Feb. 5, 2004, 2 pages.

Lynch, Rusty, "Patch: Proposal for a new watchdog interface using sysfs," LWN.net, printed Feb. 5, 2004, 19 pages.

Dennis, James T., "Watchdog daemon," www.linuxgazette.com/issue78, printed Feb. 5, 2004, 3 pages.

"Spinlock," http://en.wikipedia.org, Wikipedia, printed Feb. 5, 2004, 1 page.

"Deadlock detected waiting for spinlock," Technical Information Document TID 10072683, http://support.novell.com, Novell Inc., Provo, UT, printed Feb. 5, 2004, 2 pages.

Doelle, Juergen, "Improving spinlock contention for dbench, 2$^{nd}$ version," www.geocrawler.com, printed Feb. 5, 2004, 8 pages.

"Linux spinlock.h, generic versions of the spinlocks and read-write locks," code listing, http://www2.randomlogic.com, printed Feb. 5, 2004, 4 pages.

* cited by examiner

MULTI-PROCESSOR SYSTEM HAVING A WATCHDOG FOR INTERRUPTING THE MULTIPLE PROCESSORS AND DEFERRING PREEMPTION UNTIL RELEASE OF SPINLOCKS

FIELD OF THE INVENTION

The present invention relates generally to multi-processor systems and more particularly to the use of a watchdog for detecting faults in a multi-processor system.

BACKGROUND OF THEN INVENTION

Due to a program bug or a transient malfunction, execution of a computer program will often get lost or get stuck in a loop. Once this condition is discovered, it is often possible to recover some useful results by a controlled shutdown and restart of the computer. The controlled shutdown and restart is often referred to as a "panic," and it typically involves saving diagnostic information, closing files during a shutdown of the operating system, and then resetting or re-booting the computer.

Typically a sub-system called a watchdog is used to discover when execution of a computer program gets lost or stuck in a loop. The watchdog may include a hardware interrupt timer that is normally reset periodically by proper execution of the computer program. Upon a failure to reset the interrupt timer within a certain grace period, the interrupt timer activates a non-maskable interrupt (NMI) to the computer. In response to the NMI, the computer executes a non-maskable interrupt routine that performs the controlled shutdown and restart of the computer.

In a multi-threaded, multi-processor system, it is often possible for execution of one code thread to get lost or stuck in a loop while it appears that the other threads are executing normally. However, the improper execution of one of the threads may be corrupting the execution of the other threads. Yet it is rather burdensome to allocate a separate watchdog for each of the code threads and for each of the code threads to be resetting its watchdog.

A system watchdog for a multi-threaded, multi-processor system is shown in FIG. 9 of Jean-Pierre Bono, U.S. Patent Publication 2003/0018691 published Jan. 23, 2003 and entitled "Queues for Soft Affinity Code Treads and Hard Affinity Code Threads for Allocation of Processors to Execute the Threads in a Multi-Processor System," incorporated herein by reference. Each processor has a hard affinity queue that is serviced only by that processor. Once each second, a watchdog thread is issued to the hard affinity queue of each and every processor. When each processor services its hard affinity queue and finds the watchdog thread, it turns a bit for the processor on within a status variable. In response to a NMI every ten seconds, the status variable is checked, and if any bit is off, the system is shut down and restarted. Thus, this system watchdog detects a failure of any processor to service the watchdog thread in its hard affinity queue within a grace period of about 9 to 10 seconds. A variation of this system watchdog has been used in a system having four processors, in which during each one-second interval, a single watchdog thread is woken up, and then passed in round-robin fashion from the hard affinity queue of one processor to the hard affinity queue of a next one of the processors, and once being passed through the hard affinity queues of all of the processors, the watchdog thread is suspended.

SUMMARY OF THE INVENTION

In accordance with one aspect, the invention provides a digital computer including at least one processor and a random access memory. The processor is coupled to the random access memory for access to the random access memory. The processor is programmed with a watchdog thread that is normally executed by the processor within a watchdog grace period. The digital computer is programmed to shut down and restart when the processor fails to execute the watchdog thread during the watchdog grace period. The processor is also programmed with a periodic interrupt routine that is executed by the processor for checking whether the processor holds any spinlocks, and upon finding that the processor does not hold any spinlocks, for executing the watchdog thread, and upon finding that the processor holds at least one spinlock, for deferring execution of the watchdog thread until the processor releases all of the spinlocks held by the processor.

In accordance with another aspect, the invention provides a digital computer including multiple processors, and a random access memory coupled to the processors for shared access to the random access memory. Each of the processors is programmed for normally executing a watchdog thread during a watchdog grace period. The digital computer is also programmed with a system watchdog routine executed by the digital computer system for detecting improper program execution when any of the processors fails to execute the watchdog thread during the watchdog grace period. Moreover, each of the processors is programmed with a periodic interrupt routine for checking whether each of the processors holds any spinlocks, and upon finding that a processor does not hold any spinlocks, for preempting execution of an interrupted current thread to permit execution of the watchdog thread, and upon finding that a processor holds at least one spinlock, for deferring preemption of execution of the current thread for enabling execution of the watchdog thread once the processor releases all of the spinlocks held by the processor.

In accordance with yet another aspect, the invention provides a method of operating a digital computer having at least one processor coupled to random access memory for accessing the random access memory. The method includes the processor normally executing a watchdog thread and the processor being shutdown and restarted upon failing to execute the watchdog thread during a watchdog grace period. Moreover, the processor is periodically interrupted for checking whether the processor holds any spinlocks, and upon finding that the processor does not hold any spinlocks, executing the watchdog thread, and upon finding that the processor holds at least one spinlock, deferring execution of the watchdog thread until the processor releases all of the spinlocks held by the processor.

In accordance with a final aspect, the invention provides a method of operating a digital computer system including multiple processors and a random access memory coupled to the processors for shared access to the random access memory. The method includes each of the processors normally executing a watchdog thread and the digital computer being shutdown and restarted upon any of the processors failing to execute the watchdog thread during a watchdog grace period. The method further includes each of the processors being periodically interrupted, and upon being periodically interrupted, checking whether the processor holds any spinlocks, and upon finding that the processor does not hold any spinlocks, preempting execution of an interrupted current thread to permit execution of the watchdog thread, and upon finding that the processor holds at least one spinlock, deferring preemption of execution of the current thread for enabling execution of the watchdog thread once the processor releases all of the spinlocks held by the processor.

BRIEF DESCRIPTION OF THE DRAWINGS

Additional features and advantages of the invention will be described below with reference to the drawings, in which.

Figure 1:
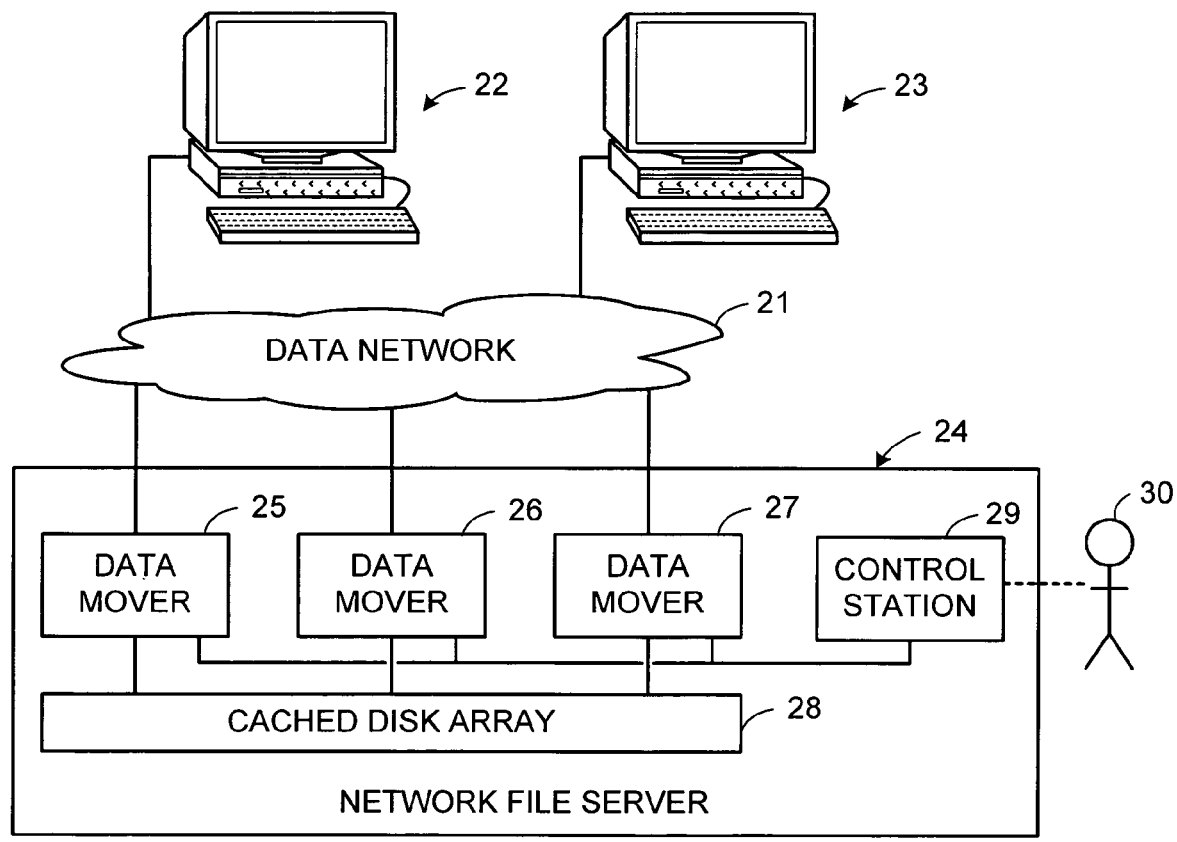
FIG. 1 is a block diagram of a data processing system including clients that share a network file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes a data network 21 interconnecting a number of clients 22, 23 and servers such as a network file server 24. The data network 21 may include any one or more of network connection technologies, such as Ethernet or Fibre Channel, and communication protocols, such as TCP/IP or UDP. The clients 22, 23, for example, are workstations such as personal computers. Various features of the network file server are further described in Vahalia et al., U.S. Pat. No. 5,893,140 issued Apr. 6, 1999, incorporated herein by reference, and Xu et al., U.S. Pat. No. 6,324,581, issued Nov. 27, 2002, incorporated herein by reference. Such a very large capacity network file server is manufactured and sold by EMC Corporation, 176 South Street, Hopkinton, Mass. 01748.

The network file server 24 includes a cached disk array 28 and a number of data mover computers 25, 26, 27. The network file server 24 is managed as a dedicated network appliance, integrated with popular network operating systems in a way, which, other than its superior performance, is transparent to the end user. The clustering of the data movers 25, 26, 27 as a front end to the cache disk array 28 provides parallelism and scalability. Each of the data movers 25, 26, 27 is a high-end commodity computer, providing the highest performance appropriate for a data mover at the lowest cost.

The network file server 24 also has a control station 29 enabling a system administrator 30 to configure and control the file server.

Figure 2:
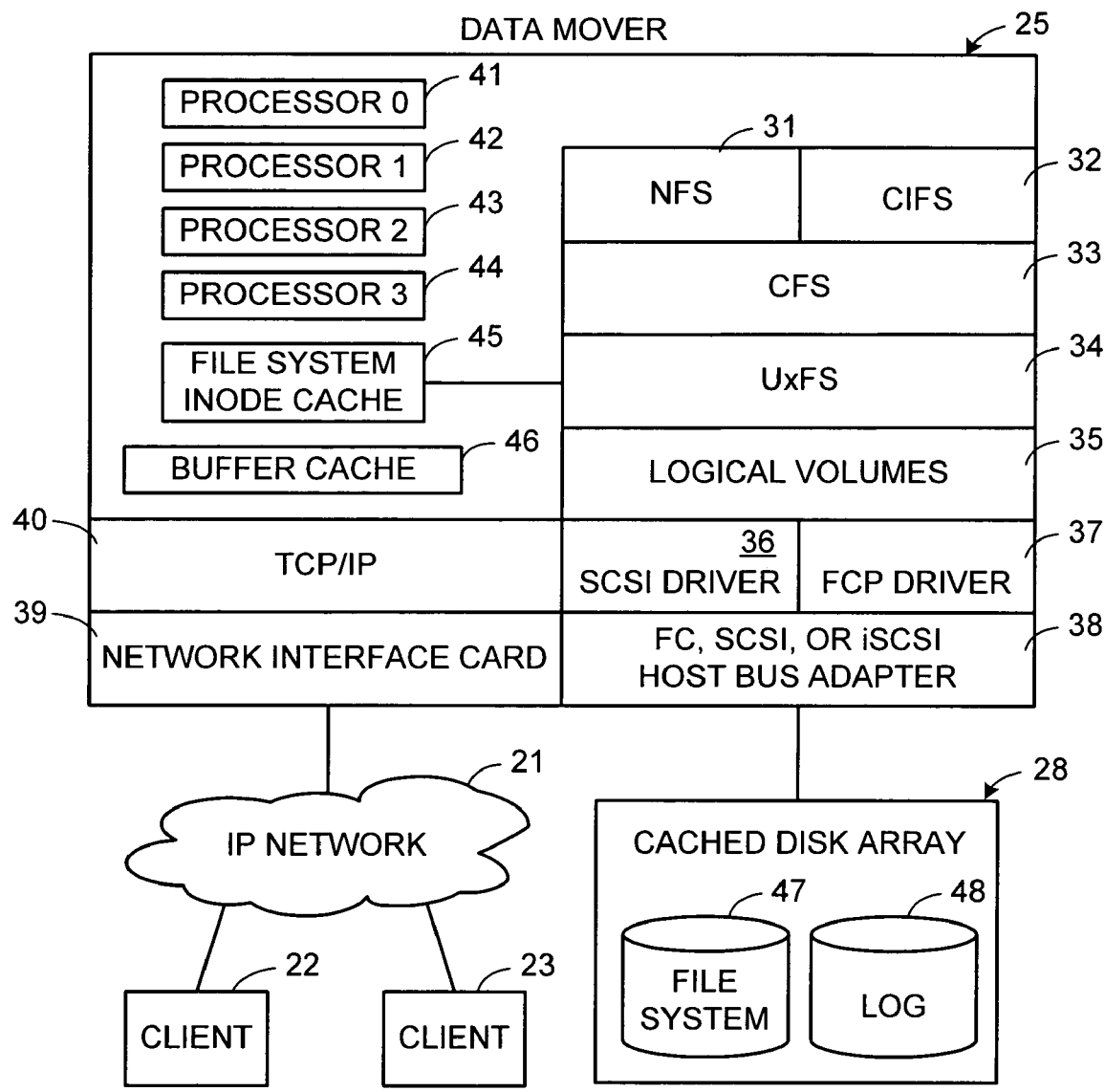
FIG. 2 shows details of a data mover in the network file server of FIG. 1.

FIG. 2 shows software modules in the data mover 25 introduced in FIG. 1. The data mover 25 has a network file system (NFS) module 31 for supporting communication among the client and the data movers of FIG. 1 over the IP network 21 using the NFS file access protocol, and a Common Internet File System (CIFS) module 32 for supporting communication over the IP network using the CIFS file access protocol. The NFS module 31 and the CIFS module 32 are layered over a Common File System (CFS) module 33, and the CFS module is layered over a Universal File System (UxFS) module 34. The UxFS module supports a UNIX-based file system, and the CFS module 33 provides higher-level functions common to NFS and CIFS. The UxFS module 34 maintains a file system inode cache 45.

The UxFS module 34 accesses data organized into logical volumes defined by a module 35. Each logical volume maps to contiguous logical storage addresses in the cached disk array 28. The module 35 is layered over an SCSI driver 36 and a Fibre-channel protocol (FCP) driver 37. The data mover 25 sends storage access requests through a host bus adapter 38 using the SCSI protocol, the iSCSI protocol, or the Fibre-Channel protocol, depending on the physical link between the data mover 25 and the cached disk array 28. To enable recovery of the file system 47 to a consistent state after a system crash, the UxFS layer 34 writes file metadata to a log 48 in the cached disk array 28 during the commit of certain write operations to the file system.

A network interface card 39 in the data mover 25 receives IP data packets from the IP network. A TCP/IP module 40 decodes data from the IP data packets for the TCP connection and stores the data in buffer cache 46. For example, the UxFS layer 34 writes data from the buffer cache 46 to the file system 47 in the cached disk array 28. The UxFS layer 34 also reads data from the file system 47 or the file system cache 45 and copies the data into the buffer cache 46 for transmission to the network clients 22, 23.

As further shown in FIG. 2, the data mover has four processors 41 to 44 also referred to as processor 0, processor 1, processor 2, and processor 3. The various software modules in the data mover 25 are subdivided into code threads, and the processors 41 to 44 concurrently execute the code threads.

Figure 3:
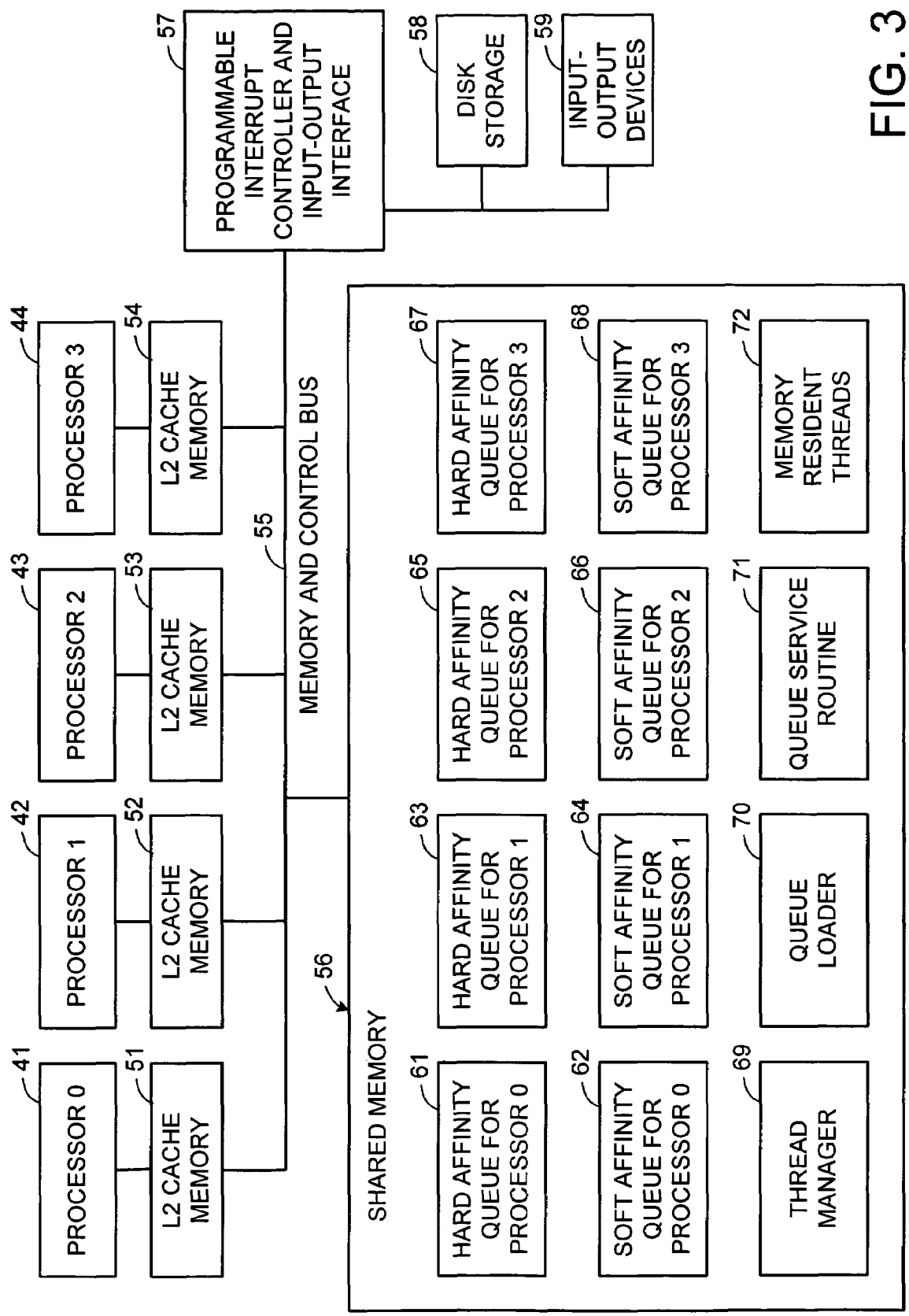
FIG. 3 shows details of multiple processors and shared memory in the data mover of FIG. 2.

FIG. 3 shows further details of the processors 41–44 and shared memory 56 in the data mover. Each of the processors 41–44 is a microprocessor chip having memory management circuitry and special machine instructions to facilitate the construction of multi-processor systems. For example, each processor is an Intel PENTIUM (Trademark) or higher microprocessor. Each processor 41–44 is connected via a respective level-2 (L2) cache memory 51, 52, 53, 54 to a shared memory and control bus 55 providing access of the processors to the shared memory 56 and a programmable interrupt controller and input-output interface 57. The programmable interrupt controller and input-output interface 57 provides an interface to disk storage 58 and input-output devices 59 such as a keyboard, video display, network interface card, or floppy-disk drive. The programmable interrupt controller and input-output interface 57 is a single integrated circuit chip such as an Intel 82489DX Advanced Programmable Interrupt Controller, although a programmable interrupt controller and the input-output interface could also be integrated on one or more of the processor chips 41–44.

If the system of FIG. 3 were to be compliant with the Intel MultiProcessor Specification, then the processor 41 having a processor number "0" would be called the "boot strap processor (BSP)", and the other processors 42, 43, 44 would be called "application processors (AP)." Once all of the processors are up and running after a power-up or system reset, the processors may perform substantially the same functions or substantially different functions, depending on the program or programs that the processors are executing. They may perform different functions when it is desirable to have a single invocation of a program to control a low-level function, such as a device driver for an input/output device that is to be shared among the processors. On the other hand, for fault tolerance and simplified failure recovery, it would be desirable for each processor to have its own dedicated I/O devices and device drivers. Due to these competing considerations, it is advantageous for some I/O devices such as a keyboard and a super VGA display to be shared among the processors, and others such as network and storage interfaces to be dedicated to respective processors. By providing a dedicated cache memory for each processor, each processor can operate at nearly 100% of the time by accessing cache memory most of the time and accessing the shared memory during a small percentage of the time.

In a multi-tasking system, it is conventional for an application program to be subdivided into code threads for performing particular functions of the program. The operating system of the system includes a thread manager that shares processing time among a number of code thread instances that are maintained on a task queue. A code thread refers to a segment of an executable program, and a code thread instance refers to not only the executable code but also a respective execution context including processor register state and local variables. The local variables, for example, are maintained on a call stack. It is conventional to place a code thread instance on a task queue by placing a code thread descriptor on the task queue. The code thread descriptor is in effect a pointer to a respective execution context, the executable code of the code thread, and in addition a respective execution priority and execution state for the code thread instance. The execution state, for example, indicates whether or not the code thread instance is running or idle, and whether or not an idle code thread is waiting on a certain condition.

The thread manager, for example, maintains the code thread instances on the task queue in priority order, by re-ordering or sorting the code thread descriptors whenever the execution priorities change. The task queue, for example, is organized as a doubly-linked list of code thread descriptors in order to facilitate the removal and replacement of a code thread descriptor when the execution priority of the code thread descriptor is changed. The code thread manager is responsive to a timer interrupt routine that periodically services the task queue and may suspend the execution of one code thread instance in favor of executing another code thread instance.

A multi-processor system typically has a similar thread manager that provides additional capabilities for concurrent execution of code thread instances on respective processors. A multi-processor thread manager typically provides capabilities for synchronization between code thread instances executing on different processors, in order to perform certain functions in parallel, to facilitate the use of the shared memory 56 for exchanging messages or sharing data among the processors, and to reduce the need for a processor to maintain an exclusive lock (a so-called "spin lock") upon the memory and control bus 55. Thus, in the multi-processor system of FIG. 3, the shared memory 56 includes a thread manager 69 managing instances of code threads 72 resident in the shared memory 56. This thread manager 69 has used a scheduler quantum of 20 milliseconds for periodically interrupting processor 0, without interrupting processors 1, 2, or 3. This scheduler interrupt has been done by applying a 500 microsecond (i.e., 2 kilohertz) clock to an interrupt input on processor P0, and invoking the scheduler for every forty of these 500 microsecond clock ticks.

Due to the respective cache memory for each of the processors, it is desirable for certain related functions to be performed on the same processor, because the processing of a first function may have ensured that data for the second function will be resident in the cache at the start of processing for the second function. However, if the same function is performed on different data but a single cache cannot hold all of the data, then it is desirable for more than one of the processors to perform the same function upon respective partitions of the data. In view of these considerations, it is desirable to associate "hard" and "soft" processor affinities to code thread instances. A code thread instance is a particular invocation or process of execution of the code thread. A code thread instance having a "hard" processor affinity is executed only by a specified one of the processors 41, 42, 43, 44. A code thread instance having a "soft" processor affinity should be executed by a specified one of the processors unless the specified processor is heavily loaded and another processor is less heavily loaded and is available to process the code thread instance.

Due to the hard and soft affinities of the code thread instances to the respective processors, it is desirable to provide respective hard and soft affinity queues for each of the processors. As shown in FIG. 3, for example, the hard and soft affinity queues are contained in the shared memory 56. The number zero processor 41 has a hard affinity queue 61 and a soft affinity queue 62, the number one processor 42 has a hard affinity queue 63 and a soft affinity queue 64, the number two processor 43 has a hard affinity queue 65 and a soft affinity queue 66, and the number three processor 44 has a hard affinity queue 67 and a soft affinity queue 68.

Each queue is a list of items waiting to be processed. The queue is typically serviced in a first-in, first-out basis, unless the items in the queue are assigned different priorities, in which case the items are processed in the order of their priorities. The hard affinity queue for each processor is a list of code thread instances having a hard affinity for the processor and waiting to be executed by the processor. The soft affinity queue for each processor is a list of code thread instances having a soft affinity for the processor and waiting to be executed by the processor.

A code thread instance on a hard affinity queue of a processor is executed only by that processor. A code thread instance in a soft affinity queue of a processor should be executed by that processor but another processor may execute the code thread instance and should execute the code thread instance if the other processor would otherwise be idle.

For loading code thread descriptors onto the hard and soft affinity queues, the shared memory 56 contains a queue loader routine 70 that is called by the thread manager 69. The thread manager 69, for example, can be a conventional thread manager that has been modified to use the queue loader routine 70 instead of its own queue loader routine that would load code thread descriptors onto a single task queue. The thread manager 69, for example, is executed exclusively by the number zero processor 51 in response to a periodic timer interrupt. In response to each timer interrupt, the thread manager 69 calls the queue loader 70 to load zero, one, or more code thread descriptors onto the hard affinity queues or soft affinity queues. Each time that the thread manager 69 calls the queue loader 70, the queue loader loads one code thread descriptor onto a selected one of the hard affinity queues or soft affinity queues.

Each of the processors 41, 42, 43, 44 is responsible for servicing its respective hard affinity queue 61, 63, 65, 67 and its respective soft affinity queue 62, 64, 66, 68, and if its respective soft affinity queue is found to be empty during the time for servicing its respective soft affinity queue, then the processor will service the other soft affinity queues. Each of the processors 41, 42, 43, 44 executes a queue service routine 71 in order to perform this queue servicing. Each of the processors executes the queue service routine 71 on a periodic basis in response to a timer interrupt, in order to select at most one code thread instance to execute each time that the processor executes the queue service routine.

The present invention more particularly concerns a system watchdog for a data mover using multiple processors. Various techniques have been used for handling hardware and software failures in a network file server of the kind shown in FIG. 1. For example, as described in Duso et al., U.S. Pat. No. 5,987,621, issued Nov. 16, 1999, and entitled "Hardware and Software Failover Services for a File Server," incorporated herein by reference, each of the data mover computers 25, 26, 27 periodically transmits a "heartbeat" signal to the control station 29. The heartbeat signal indicates the present condition of the data mover computer. If the control station 29 receives a heartbeat signal indicating a serious failure or fails to receive a heartbeat signal from a data mover within a timeout interval, then the control station logs the error in its cache and initiates a data mover recovery process.

When the data movers each have multiple processors, it is desirable to provide a system watchdog in each of the data movers so that the system watchdog detects processor failure before disruption of the heartbeat signal to the control station. When a data mover failure becomes so severe that the data mover does not transmit a heartbeat signal, not much can be done to recover from the failure. For example, if the control station fails to receive a heartbeat signal from a data mover within an eight second interval, then the control station polls the failed data mover for information that would permit continuance of the data mover's applications. But if the failed data mover does not respond to the control station's request for information, then the control station must simply reboot the data mover and thus the data mover's applications will be shut down and restarted.

If the system watchdog can detect a processor failure before disruption of the heartbeat signal to the control station, then it is often possible for the system watchdog to save some diagnostic information about the failed processor and begin a controlled shutdown of the data mover. The diagnostic information may be useful in preventing further occurrences of the problem. The controlled shutdown of the data mover may save some results of the data mover's applications so that these applications can continue once the data mover is rebooted.

Figure 9:
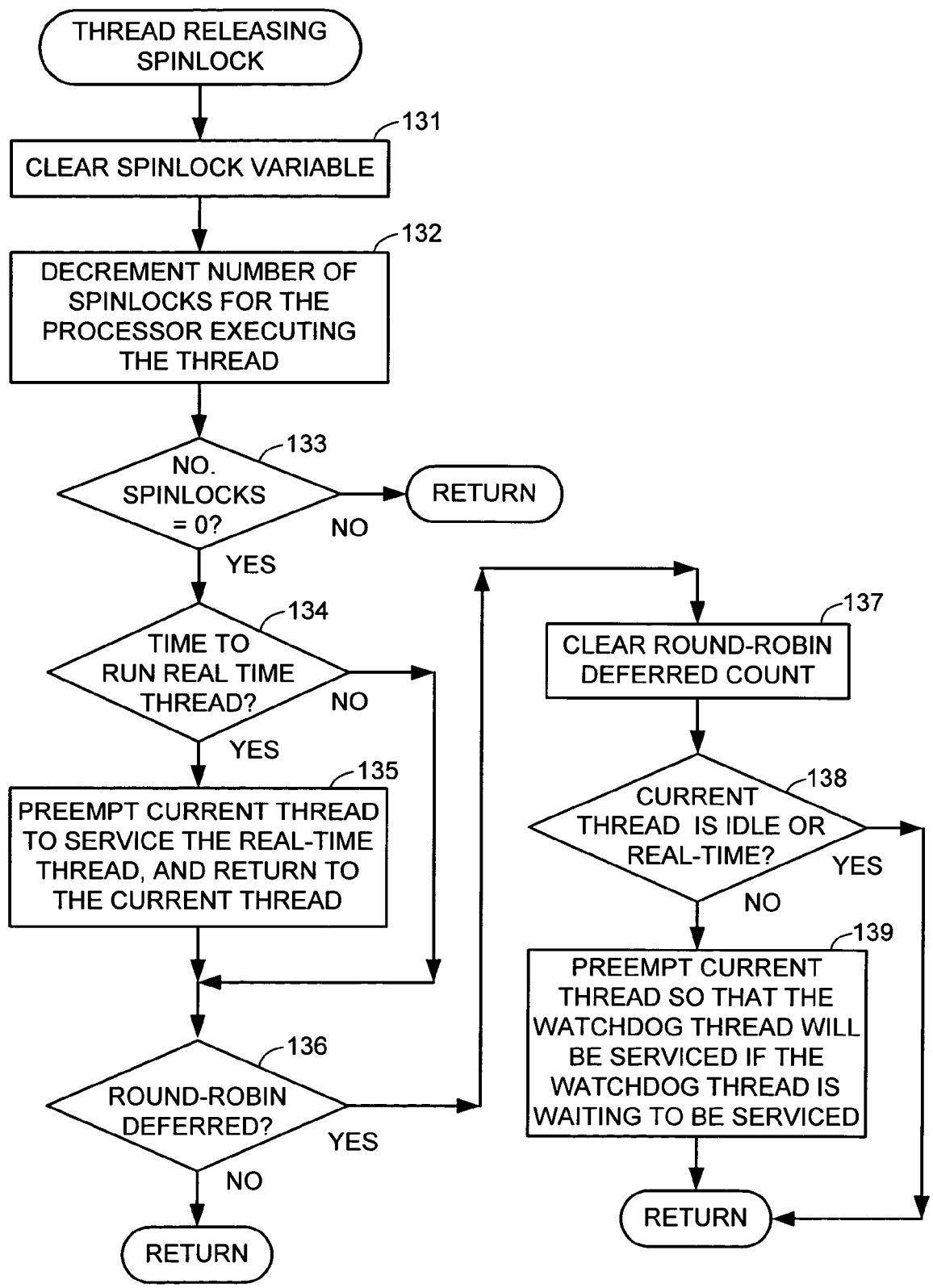
FIG. 9 is a flowchart of a routine for a thread releasing a spinlock.

As introduced above, a system watchdog for a multi-threaded, multi-processor system is shown in FIG. 9 of Jean-Pierre Bono, U.S. Patent Publication 2003/0018691 published Jan. 23, 2003. This system watchdog has been used in the data movers of a file server. However, a rather long grace period of two minutes has been used for the watchdog in order to prevent applications from triggering the watchdog and causing fake panics.

The present invention provides a better solution to the system watchdog problem by addressing the underlying cause of the fake panics. It has been discovered that the underlying cause of the fake panics was a failure of threads to be preempted by the scheduler within the watchdog grace period. Since the scheduler did not preempt the threads within the watchdog grace period, the watchdog thread was not serviced within the watchdog grace period.

A spinlock is a lock in which a thread waits in loop repeatedly checking until the lock becomes available. Spinlocks are very efficient if the threads are only likely to be blocked for a short period of time, because they avoid the overhead of operating system process re-scheduling. Spinlocks are wasteful if the lock is held for a long period of time.

Spinlocks are often held by a thread in order for the thread to perform an atomic read/write operation upon a region of the shared memory. Moreover, a thread holding a spinlock may be preventing forward progress of other threads waiting on the spinlock. For these reasons, a typical thread scheduler may prevent "preemption" of a thread holding a spinlock. Preemption of a thread by the thread scheduler involves the scheduler responding to a timer interrupt by suspending execution of a current thread in order to pass execution to another thread having the same or a higher priority.

In order to prevent spinlocks from causing fake panics, each processor is periodically interrupted in order to enable preemption for servicing of at least one watchdog thread. This periodic interrupt will be referred to as a "round-robin" interrupt. For example, the round-robin interrupt occurs every 20 milliseconds, in synchronism with the 20 millisecond thread scheduler quantum. The round-robin interrupt period, for example, is a programmable parameter, and the round-robin interrupt can also be disabled and enabled through a programmable parameter. If the current thread is holding one or more spinlocks when the round-robin interrupt occurs, preemption is deferred until the thread releases the spinlocks. This improves fairness among the processors and among the various kinds of threads. In this fashion, the round-robin interrupt permits the grace period for the system watchdog to be reduced to four seconds. The round-robin interrupt provides an alternative between preemption as typically provided by a thread scheduler, which wastes a lot of processor cycles for context switching, and no preemption, which may cause fake panics.

Figure 4:
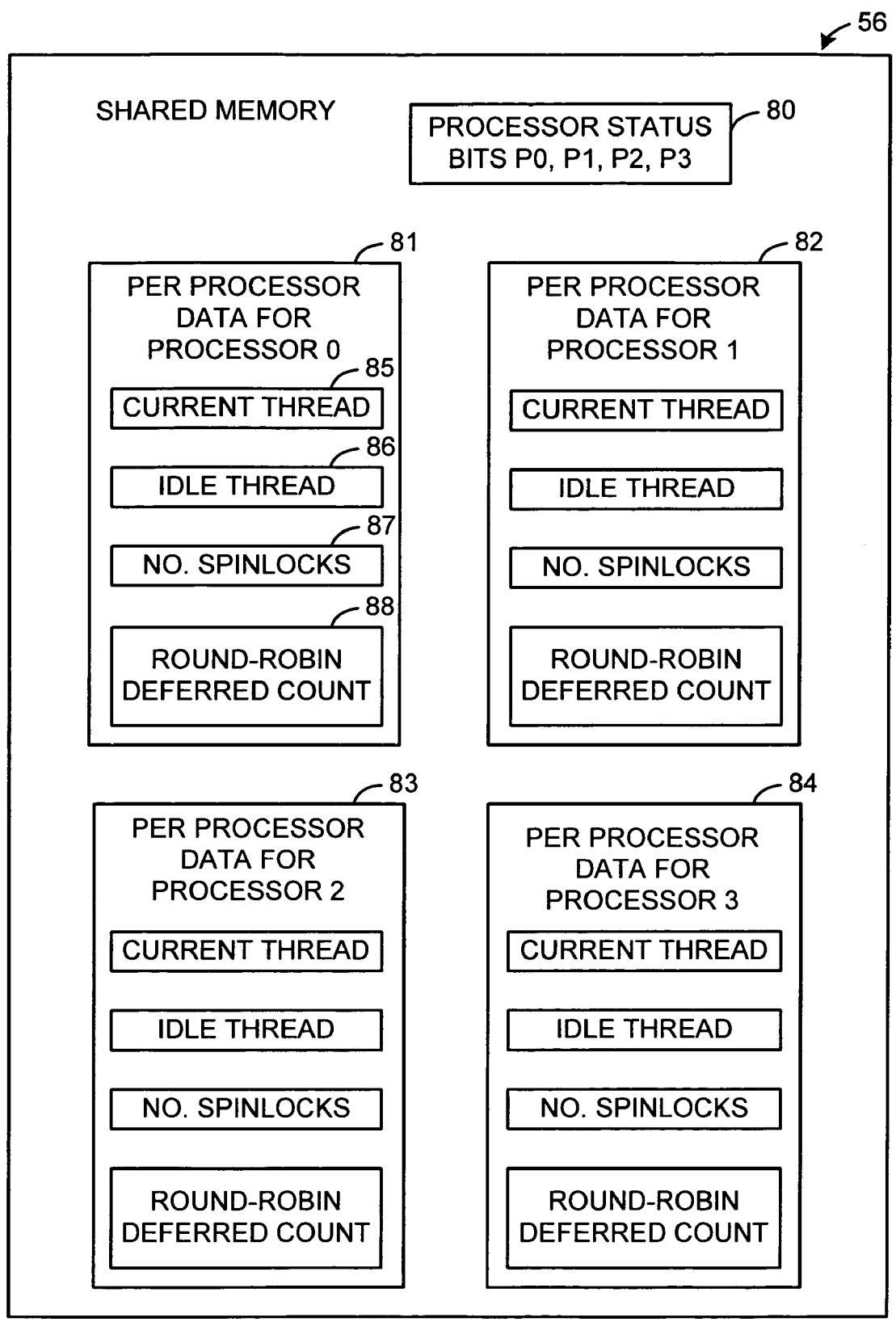
FIG. 4 shows additional information that is stored in the shared memory and used by a system watchdog.

FIG. 4 shows data that is stored in the shared memory 56 and used for preventing fake panics. The data includes processor status 80 including bits P0, P1, P2, and P3 that are cleared by the system watchdog and set when the respective processor services the watchdog thread. The data also includes respective per processor data 81, 82, 83, 84 for each processor. For processor 0, the per processor data includes identification of a current thread 85, identification of an idle thread 86, identification of the number of spinlocks 87 (i.e., the number of spinlocks held by the current thread), and round-robin information 88 including a round-robin deferred count indicating whether or not the current thread was holding at least one spinlock when a round-robin interrupt has occurred so that preemption should occur upon release of the last spinlock held by the current thread. When the round-robin deferred count is zero, it indicates that preemption should not occur upon release of the last spinlock held by the current thread, and when the round-robin deferred count is not zero, it indicates that preemption should occur upon release of the last spinlock held by the current thread. The round-robin deferred count further indicates how many times that the round-robin interrupt occurred and preemption was deferred since the beginning of the current watchdog grace period due to the current thread holding at least one spinlock. The round-robin deferred count is useful diagnostic information for indicating whether a panic occurred due to a failure of the current thread to release its spinlocks within the watchdog grace period. Each of the other processors 1, 2, and 3 has similar per-processor data. The number of spinlocks, the round-robin deferred count, and the processor bits P0, P1, P2, P3 in the processor status are initially reset to zero during boot of processor 0.

Figure 5:
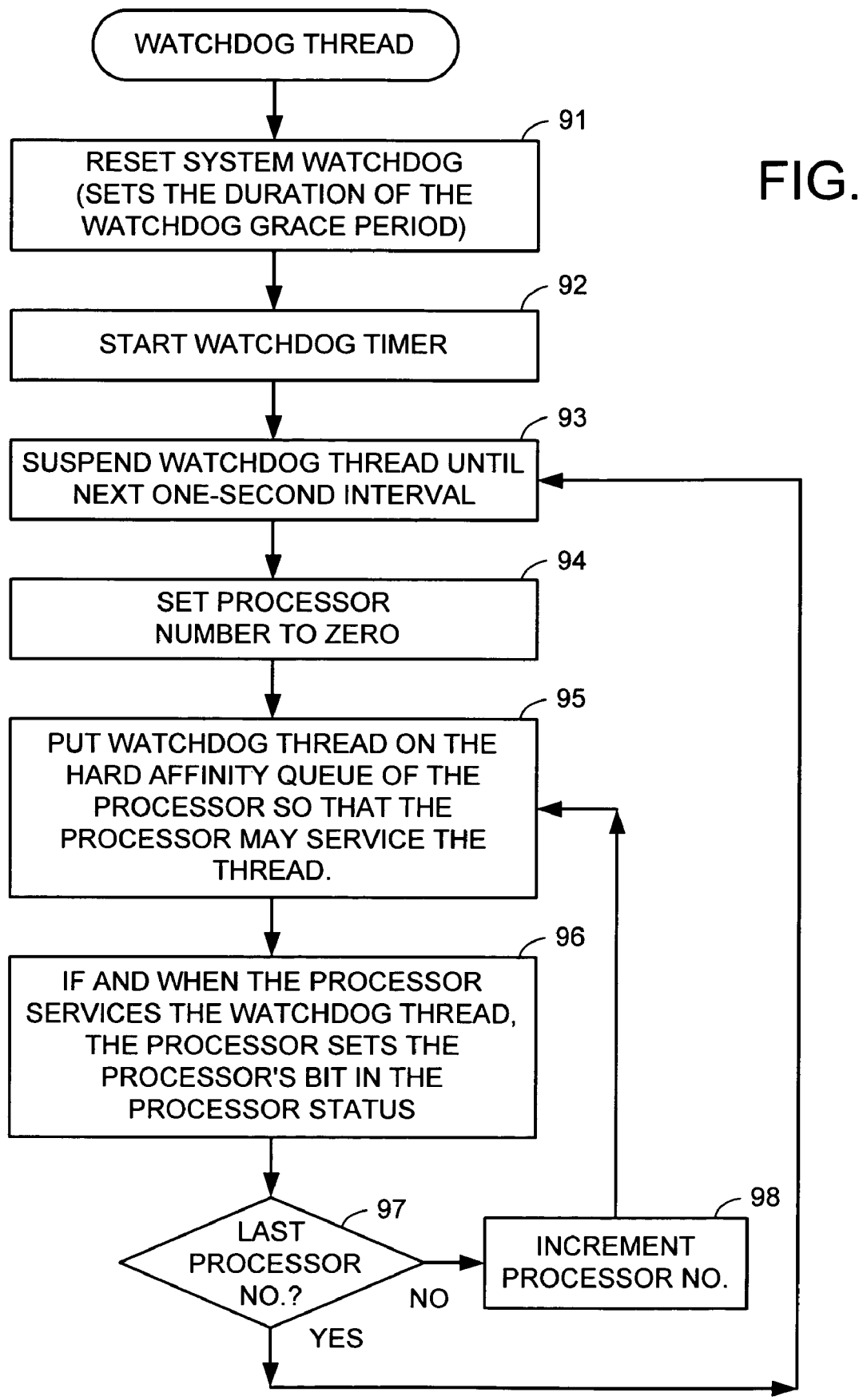
FIG. 5 is a flowchart of a watchdog thread that is moved among hard affinity queues of the processors in the data mover.

FIG. 5 is a flowchart of the watchdog thread. At any given time, the watchdog thread is suspended or is on the hard affinity queue of one of the processors. In a first step 91, the watchdog thread resets the system watchdog. This sets the duration of the watchdog grace period. In step 92, the watchdog thread starts the watchdog timer that periodically interrupts processor 0 (using a non-maskable interrupt) at the expiration of each watchdog grace period causing execution of the system watchdog interrupt routine in FIG. 6. In step 93, the watchdog thread suspends itself until the next one-second interval.

In step 94 of FIG. 5, the watchdog thread sets a processor number index to zero. In step 95, the watchdog thread places a thread descriptor for itself on the tail of the hard affinity queue of the processor indexed by the processor number so that the processor may service the watchdog thread. In step 96, if and when the processor services the watchdog thread, the processor sets the processor's bit in the processor status.

After step 96, the watchdog thread places its thread descriptor on the hard affinity queue of the next processor in round-robin sequence. In particular, in step 97, the watchdog thread checks whether it is presently being executed by the processor having the last processor number, which is three for a data mover having four processors. If the watchdog thread is presently being executed by the processor having the last processor number, then execution loops back to step 93, to suspend the watchdog thread until the next one-second interval, and then set the processor number to zero in step 94. Otherwise, execution branches from step 97 to step 98, to increment the processor number. After step 98, execution loops back to step 95. In this fashion, during normal operation, the watchdog thread descriptor is passed in round-robin fashion among the hard affinity queues of the processors in the data mover.

Figure 6:
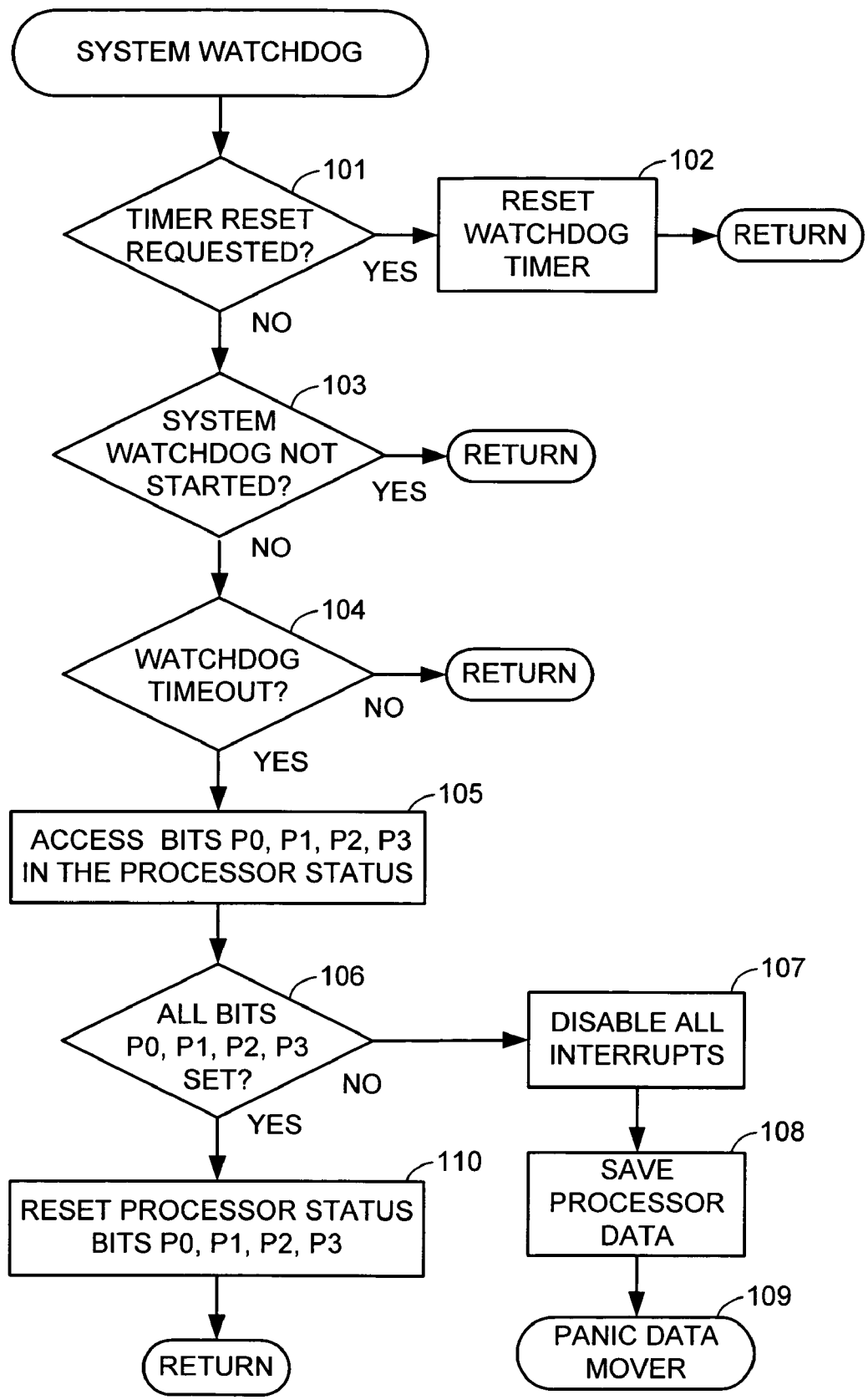
FIG. 6 is a flowchart of a system watchdog routine.

FIG. 6 is a flowchart of the system watchdog. The system watchdog, for example, is a timer interrupt routine in firmware (read-only memory) for the boot processor (processor 0). Normally the timer interrupt routine is executed in response to a timer interrupt although it can also be executed in response to a software interrupt for initialization and debugging. In a first step 101, if the system watchdog has been invoked by a software interrupt requesting a reset of the watchdog timer, then execution branches to step 102 to reset the watchdog timer, and execution returns. In step 103, if the system watchdog has been invoked without the system watchdog first having been initialized, then execution returns. In step 104, if the watchdog timer interrupt has not invoked the system watchdog, then execution returns.

The watchdog timer interrupt sequence begins step 105. In step 105, the system watchdog accesses the processor bits P0, P1, P2, and P3 in the processor status. In step 106, if all of these processor bits are not set, then execution branches to step 107. In step 107, the system watchdog disables all interrupts. In step 108, the system watchdog saves processor data for diagnostic purposes, such as the per-processor data shown in FIG. 4, by reading the processor data from the shared random-access memory and writing it to disk. Then in step 109, the system watchdog panics the data mover, so that the data mover is shut down and rebooted.

In step 106, if all of the processor bits P0, P1, P2, and P3 in the processor status are set, then execution continues from step 106 to step 110. In step 110, the system watchdog resets the processor bits P0, P1, P2, and P3 in the processor status, and execution returns.

Figure 7:
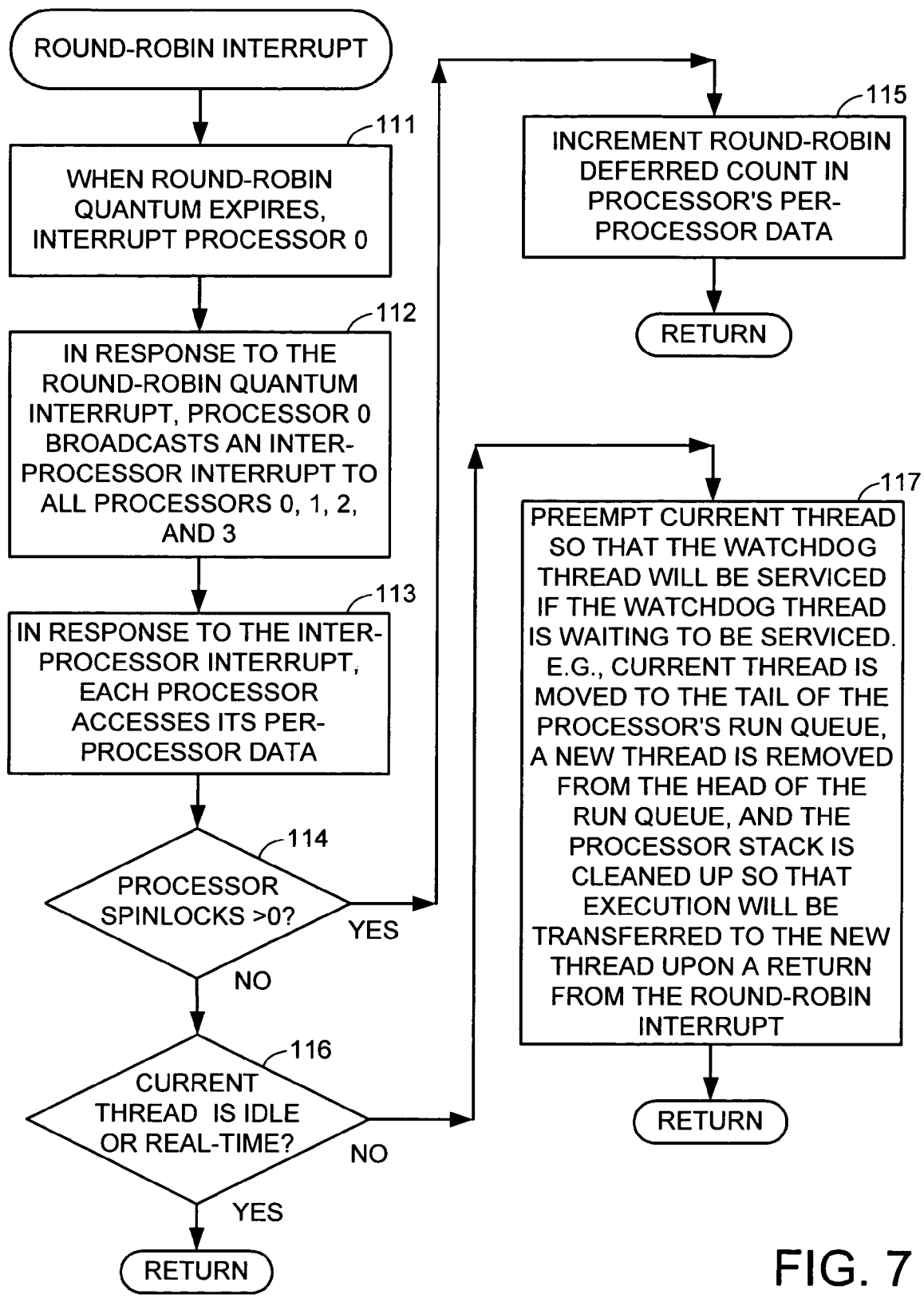
FIG. 7 is a flowchart of a round-robin interrupt routine.

FIG. 7 is a flowchart of the round-robin interrupt. In step 111, when the 20 millisecond round-robin quantum expires, processor 0 is interrupted. In step 112, in response to the round-robin quantum interrupt, processor 0 broadcasts an inter-processor interrupt to all of the processors 0, 1, 2, and 3.

In response to the inter-processor interrupt, in step 113, each processor checks its per-processor data in the shared memory. In step 114, if the number of spinlocks for the processor is greater than zero, then execution branches to step 115. In step 115, the processor increments its round-robin deferred count in the per-processor data, and execution returns from the interrupt.

In step 114, if the number of spinlocks for the processor is not greater than zero, then execution continues to step 116. In step 116, if the processor's current thread is idle or real-time, then execution returns from the interrupt. There is no need to go back to the scheduler because idle or real-time threads look for things to be done. Processing of an idle or real-time thread should not hold up the processor so that the watchdog thread should be processed in due course.

In step 116, if the processor's current thread is not idle or real-time, then execution branches to step 117. In step 117, the current thread is preempted so that the watchdog thread will be serviced if the watchdog thread is waiting to be serviced. For example, the current thread is moved to the tail of the processor's run queue (e.g., the processor's hard affinity queue if the current thread was last picked up from the processor's hard affinity queue, and otherwise the processor's soft affinity queue). Then a new thread is removed from the head of the processor's run queue (e.g., the processor's hard affinity queue if the processor's hard affinity queue is not empty, and otherwise the processor's soft affinity queue). Then the processor's stack is cleaned up so that execution will be transferred to the new thread upon a return from the round-robin interrupt. After step 117, execution returns from the interrupt to pass execution to the new thread. In a typical case, the processor will eventually return to execution of the interrupted current thread. If the interrupted current thread has a soft affinity for the processor, it is possible for execution of the interrupted thread to be resumed by another processor, which will access the context of the interrupted current thread in the shared random access memory, and maintain the per processor data accordingly.

Figure 8:
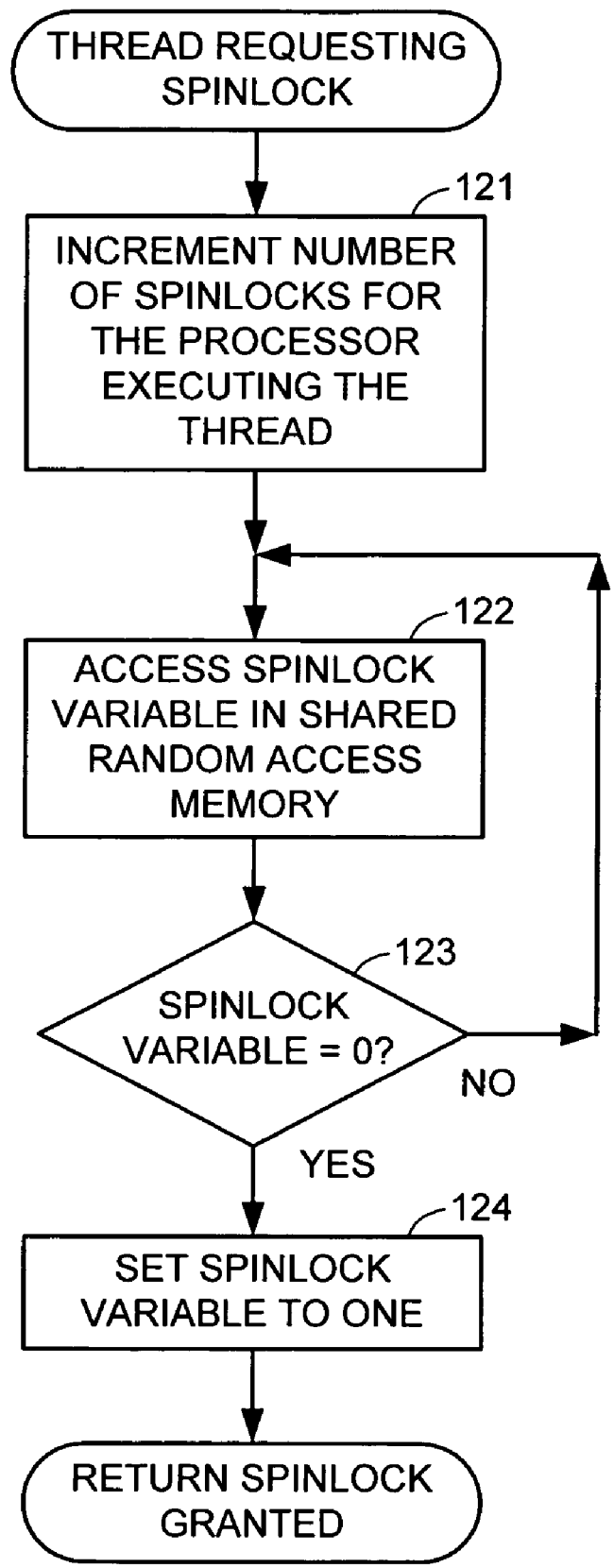
FIG. 8 is a flowchart of a routine for a thread requesting a spinlock.

FIG. 8 shows a flowchart of a routine called by the current thread when requesting a spinlock. A spinlock variable in the shared random access memory has a value of zero if the spinlock is not held by any thread of any of the processors, or else a value of one. In a first step 121, the number of spinlocks for the processor executing the current thread is incremented. In step 122, the current thread accesses the spinlock variable. In step 123, if the spinlock variable is not zero, then the spinlock is presently denied to the current thread, and execution loops back to step 122 to again check whether the spinlock can be granted to the current thread. Once the spinlock variable is found to be zero, execution continues from step 123 to step 124. In step 124, the spinlock variable is set to one, and execution returns with the spinlock being granted to the current thread.

FIG. 9 is a flowchart of a routine called by a thread for releasing a spinlock. In a first step 131, the spinlock variable is cleared. Then in step 132, the number of spinlocks for the processor executing the thread is decremented. In step 133, if the number of spinlocks has not been decremented to zero, then execution returns. Otherwise, execution continues from step 133 to step 134. In step 134, if it is time to run the real-time thread, then execution continues to step 135. In step 135, the current thread is preempted to service the real-time thread, and then execution returns to the current thread. Execution continues from step 135 to step 136. Execution also continues to step 136 from step 134 when it is not time to run the real-time thread.

In step 136, if the round-robin deferred count is zero, then execution returns. Otherwise, execution continues from step 136 to step 137. In step 137, the round-robin deferred count is cleared. In step 138, if the current thread is an idle thread or is a real-time thread, then execution returns. Otherwise, execution continues from step 138 to step 139. In step 139, the current thread is preempted so that the watchdog thread will be serviced if the watchdog thread is waiting to be serviced by the processor executing the current thread. After step 139, execution returns.

Figure 10:
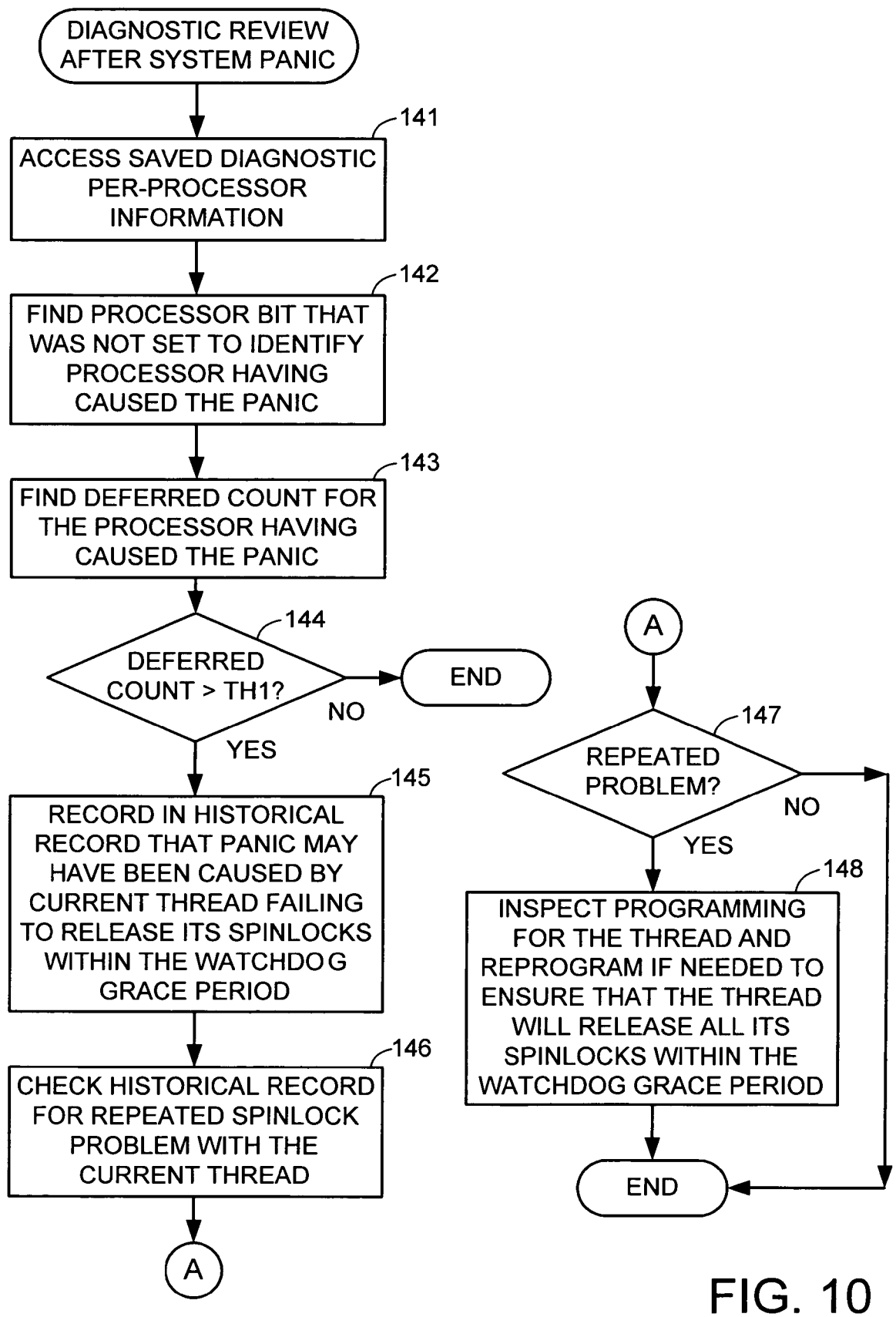
FIG. 10 is a flowchart of a procedure for diagnostic review after a system panic.

FIG. 10 is a flowchart of a procedure for diagnostic review after a system panic. In a first step 141, the saved diagnostic per-processor information is accessed. Next, in step 142, the processor bits P0, P1, P2, P3 from the saved processor status are inspected to find the processor bit that was not set, in order to identify the processor having the problem that caused the panic. In step 143, the deferred count for the processor having caused the panic is found. In step 144, the deferred count for the processor having caused the panic is compared to a threshold (TH1), and if the threshold is not exceeded, then the procedure is finished. Otherwise, if the threshold is exceeded, execution continues to step 145 to record in a historical record that a panic may have been caused by the current thread failing to release its spinlocks within the watchdog grace period. The threshold TH1, for example, is slightly less than the number of round-robin interrupts that occur within the watchdog grace period. In step 146, the historical record is checked for repeated spinlock problems with the current thread. In step 147, if there have not been repeated spinlock problems with the current thread, then the procedure is finished. Otherwise, execution continues from step 147 to step 148. In step 148, the programming for the current thread is inspected and the thread is reprogrammed if needed to ensure that the thread will release all of its spinlocks within the watchdog grace period. After step 148, the procedure is finished.

In view of the above, each processor in a multi-processor system is periodically interrupted for preempting the current thread for servicing of a watchdog thread during normal operation. Upon failing to service the watchdog thread over a grace period, a system watchdog initiates an orderly shutdown and reboot of the system. In such a system, there has been discovered a problem of the system watchdog causing panics due to a failure of threads to be preempted by the scheduler within the watchdog grace period. In order to prevent spinlocks from causing such fake panics, if the current thread is holding one or more spinlocks when the periodic interrupt occurs, then preemption is deferred until the thread releases the spinlocks. For diagnostic purposes, a count is kept of the number of times that preemption is deferred for each processor during each watchdog grace period. If a panic is caused by a problem with a processor and this deferred count for the processor exceeds a threshold slightly less than the number of periodic interrupts within the watchdog grace period, then a record is made of a possible spinlock problem with the processor's current thread at the time of the panic. If a thread has repeated spinlock problems, then the thread is inspected for re-programming if needed to ensure that the thread will release all of its spinlocks within the watchdog grace period.

What is claimed is:

1. A digital computer comprising:
at least one processor and a random access memory, said at least one processor being coupled to the random access memory for access to the random access memory;
said at least one processor being programmed with a watchdog thread that is normally executed by said at least one processor during a watchdog grace period, and the digital computer being programmed to shut down and restart when said at least one processor fails to execute the watchdog thread during the watchdog grace period; and
said at least one processor being programmed with a periodic interrupt routine that is executed by said at least one processor for checking whether said at least one processor holds any spinlocks, and upon finding that said at least one processor does not hold any spinlocks, for executing the watchdog thread, and upon finding that said at least one processor holds at least one spinlock, for deferring execution of the watchdog thread until said at least one processor releases all of the spinlocks held by said at least one processor.

2. The digital computer as claimed in claim 1, wherein said at least one processor is programmed for deferring execution of the watchdog thread by setting an indicator upon finding that said at least one processor holds at least one spinlock, and by checking the indicator when said at least one processor releases all of the spinlocks held by said at least one processor, and upon checking the indicator and finding that the indicator is set, preempting execution of a current thread for execution of the watchdog thread.

3. The digital computer as claimed in claim 1, which includes multiple processors coupled to the random access memory for shared access to the random access memory, the multiple processors being programmed for obtaining spinlocks for access to the memory, and the digital computer being programmed for maintaining a count for each of the processors of the number of spinlocks held by said each of the processors.

4. The digital computer as claimed in claim 3, wherein said each of the processors is programmed for decrementing the count for said each of the processors upon releasing a spinlock and checking whether the count for said each of the processors has been decremented to zero, and upon finding that the count for said each of the processors has been decremented to zero, for preempting execution of a current thread for execution of the watchdog thread.

5. The digital computer as claimed in claim 4, wherein said each of the processors is programmed for preempting execution of the current thread for execution of the watchdog thread by removing a thread from a respective run queue for said each of the processors, placing the current thread on the respective run queue for said each of the processors, and transferring execution to the thread removed from the respective run queue for said each of the processors.

6. The digital computer as claimed in claim 1, wherein said at least one processor is programmed for keeping a count of the number of times that execution of the watchdog thread has been deferred for said at least one of the processors during the watchdog grace period.

7. A digital computer comprising:
multiple processors; and
a random access memory coupled to the processors for shared access to the random access memory;
each of the processors being programmed for normally executing a watchdog thread during a watchdog grace period;
the digital computer being programmed with a system watchdog routine for detecting improper program execution when any of the processors fails to execute the watchdog thread during the watchdog grace period; and
said each of the processors being programmed with a periodic interrupt routine for checking whether said each of the processors holds any spinlocks, and upon finding that said each of the processors does not hold any spinlocks, for preempting execution of an interrupted current thread to permit execution of the watchdog thread, and upon finding that said each of the processors holds at least one spinlock, for deferring preemption of execution of the current thread for enabling execution of the watchdog thread once said each of the processors releases all of the spinlocks held by said each of the processors.

8. The digital computer as claimed in claim 7, wherein said each of the processors is programmed for deferring preemption of execution of the current thread upon finding that said each of the processors holds at least one spinlock by setting a respective indicator for said each of the processors upon finding that said each of the processors holds at least one spinlock, and for checking the respective indicator for said each of the processors when said each of the processors releases all of the spinlocks held by said at least one of the processors, and upon checking the respective indicator for said each of the processors and finding that the respective indicator for said each of the processors is set, for preempting execution of the current thread for enabling execution of the watchdog thread.

9. The digital computer as claimed in claim 7, wherein the digital computer is programmed to pass a single instance of the watchdog thread among the processors.

10. The digital computer as claimed in claim 7, wherein the watchdog thread is programmed to set a processor status bit for said each of the processors when the watchdog thread is executed by said each of the processors.

11. The digital computer as claimed in claim 7, wherein the digital computer is programmed to execute the periodic interrupt routine in synchronism with a thread handler interrupt.

12. The digital computer as claimed in claim 7, wherein the digital computer is programmed to maintain a count for said each of the processors of spinlocks upon said each of the processors.

13. The digital computer as claimed in claim 12, wherein said each of the processors is programmed for decrementing the count for said each of the processors when releasing a spinlock and for checking whether said each of the processors has decremented the count for said each of the processors to zero, and upon finding that said each of the processors has decremented the count for said each of the processors to zero, for preempting execution of the current thread of said each of the processors for execution of the watchdog thread.

14. The digital computer as claimed in claim 12, wherein the periodic interrupt routine is programmed to terminate for said each of the processors when the count for said each of the processors of spinlocks upon said each of the processors is zero and the current thread of said at least one of the processors is a real-time thread or an idle thread.

15. The digital computer as claimed in claim 12, wherein the periodic interrupt routine is programmed to preempt execution of a current thread of said each of the processors in favor of execution of the watchdog thread by said each of the processors when the count for said each of the processors of spinlocks upon said each of the processors is zero and the current thread of said each of the processors is neither a real-time thread nor an idle thread.

16. The digital computer as claimed in claim 7, wherein said each of the processors is programmed for keeping a respective count of the number of times that preemption is deferred for said each of the processors during the watchdog grace period.

17. A method of operating a digital computer having at least one processor coupled to random access memory for accessing the random access memory, said method comprising said at least one processor normally executing a watchdog thread during a watchdog grace period, and said at least one processor being shutdown and restarted upon failing to execute the watchdog thread during the watchdog grace period; and
said at least one processor being periodically interrupted for checking whether said at least one processor holds any spinlocks, and upon finding that said at least one processor does not hold any spinlocks, executing the watchdog thread, and upon finding that said at least one processor holds at least one spinlock, deferring execution of the watchdog thread until said at least one processor releases all of the spinlocks held by said at least one processor.

18. The method as claimed in claim 17, which includes said at least one processor deferring execution of the watchdog thread by setting an indicator upon finding that said at least one processor holds at least one spinlock, and by checking the indicator when said at least one processor releases all of the spinlocks held by said at least one processor, and upon checking the indicator and finding that the indicator is set, preempting execution of a current thread for execution of the watchdog thread.

19. The method as claimed in claim 17, wherein the digital computer includes multiple processors coupled to the random access memory for shared access to the random access memory, and wherein the method includes the digital computer maintaining a count for each of the processors of the number of spinlocks held by said each of the processors.

20. The method as claimed in claim 19, wherein said each of the processors decrements the count for said each of the processors upon releasing a spinlock and checks whether the count for said each of the processors has been decremented to zero, and upon finding that the count for said each of the processors has been decremented to zero, said each of the processors preempts execution of a current thread for execution of the watchdog thread.

21. The method as claimed in claim 20, wherein said each of the processors preempts execution of the current thread for execution of the watchdog thread by removing a thread from a respective run queue for said each of the processors, placing the current thread on the respective run queue for said each of the processors, and transferring execution to the thread removed from the respective run queue.

22. The method as claimed in claim 17, wherein said at least one of the processors keeps a count of the number of times that execution of the watchdog thread is deferred during the watchdog grace period for said at least one of the processors.

23. The method as claimed in claim 22, which includes performing a diagnostic procedure after a shutdown and restart of the digital computer, the diagnostic procedure inspecting saved processor status information including the respective count of the number of times that execution of the watchdog thread is deferred during the watchdog grace period for said at least one of the processors in order to determine whether the shutdown and restart of the digital computer is likely to have been caused by said at least one of the processors failing to have released any spinlocks during the watchdog grace period.

24. A method of operating a digital computer including multiple processors and a random access memory coupled to the processors for shared access to the random access memory, said method comprising each of the processors normally executing a watchdog thread during a watchdog grace period, and the digital computer being shutdown and restarted upon any of the processors failing to execute the watchdog thread during the watchdog grace period; and said each of the processors being periodically interrupted, and upon being periodically interrupted, checking whether said each of the processors holds any spinlocks, and upon finding that said each of the processors does not hold any spinlocks, preempting execution of an interrupted current thread to permit execution of the watchdog thread, and upon finding that said each of the processors holds at least one spinlock, deferring preemption of execution of the current thread for enabling execution of the watchdog thread once said each of the processors releases all of the spinlocks held by said each of the processors.

25. The method as claimed in claim 24, which includes said each of the processors deferring preemption of execution of the current thread upon finding that said each of the processors holds at least one spinlock by setting a respective indicator for said each of the processors upon finding that said each of the processors holds at least one spinlock, and by checking the respective indicator for said each of the processors when said each of the processors releases all of the spinlocks held by said at least one of the processors, and upon checking the respective indicator for said each of the processors and finding that the respective indicator for said each of the processors is set, preempting execution of the current thread for enabling execution of the watchdog thread.

26. The method as claimed in claim 24, which includes passing execution of a single instance of the watchdog thread among the processors.

27. The method as claimed in claim 24, which includes the watchdog thread setting a processor status bit for said each of the processors when the watchdog thread is executed by said each of the processors.

28. The method as claimed in claim 24, which includes the digital computer executing a thread handler routine in synchronism with the periodic interrupt.

29. The method as claimed in claim 24, which includes the digital computer maintaining a count for said each of the processors of spinlocks upon said each of the processors.

30. The method as claimed in claim 29, which includes said each of the processors decrementing the count for said each of the processors when releasing a spinlock and checking whether said each of the processors has decremented the count for said each of the processors to zero, and upon finding that said each of the processors has decremented the count for said each of the processors to zero, preempting execution of the current thread of said each of the processors for execution of the watchdog thread.

31. The method as claimed in claim 29, which includes terminating execution by said each of the processors of an interrupt routine for handling the periodic interrupt when the count for said each of the processors of spinlocks upon said each of the processors is zero and the current thread of said each of the processors is a real-time thread or an idle thread.

32. The method as claimed in claim 29, wherein said each of the processors responds to the periodic interrupt by preempting execution of the current thread of said each of the processors in favor of execution of the watchdog thread by said each of the processors when the count for said each of the processors of spinlocks upon said each of the processors is zero and the current thread of said each of the processors is neither a real-time thread nor an idle thread.

33. The method as claimed in claim 24, wherein said each of the processors keeps a respective count of the number of times that preemption is deferred for said each of the processors during the watchdog grace period.

34. The method as claimed in claim 33, which includes performing a diagnostic procedure after a shutdown and restart of the digital computer, the diagnostic procedure inspecting saved processor status information including the respective count of the number of times that preemption is deferred during the watchdog grace period for at least one of the processors in order to determine whether the shutdown and restart of the digital computer is likely to have been caused by said at least one of the processors failing to have released any spinlocks during the watchdog grace period.

* * * * *